United States Patent [19]

Lewicki et al.

[11] 3,778,791

[45] Dec. 11, 1973

[54] THERMOMAGNETIC RECORDING AND MAGNETO-OPTIC PLAYBACK SYSTEM HAVING CONSTANT INTENSITY LASER BEAM CONTROL

[75] Inventors: George W. Lewicki, Studio City; John E. Guisinger, Altadena, both of Calif.

[73] Assignee: The United States of America as represented by the Administrator of the National Aeronautics and Space Administration, Washington, D.C.

[22] Filed: Oct. 6, 1971

[21] Appl. No.: 187,143

Related U.S. Application Data

[62] Division of Ser. No. 34,989, May 6, 1970, abandoned.

[52] U.S. Cl.340/174.1 M, 179/100.2 CH, 250/205, 250/217, 340/174 YC, 350/151

[51] Int. Cl. ...... G11b 11/10, G02f 1/22, G01j 1/32

[58] Field of Search .......................... 179/100.2 CH; 340/174.1 M; 346/74 MT; 340/174 YC; 350/151; 250/205, 217, 225, 227

[56] References Cited

UNITED STATES PATENTS

| | | | |
|---|---|---|---|
| 3,651,281 | 3/1972 | Becker | 179/100.2 CH |
| 3,624,622 | 11/1971 | Chen | 340/174.1 M |
| 3,255,355 | 6/1966 | Frenk et al. | 250/205 |

OTHER PUBLICATIONS

Roshon, D. D.; Laser Modulation Control Method; I.B.M. Tech. Disc. Bull.; Vol. 12, No. 3, Aug. 1969, pg. 485.

*Primary Examiner*—Bernard Konick
*Assistant Examiner*—Robert S. Tupper
*Attorney*—A. M. Fernandez

[57] ABSTRACT

Apparatus is disclosed for maintaining the intesnity of a laser beam substantially constant in a thermomagnetic recording and magneto-optic playback system wherein an isotropic film is heated along a continuous path by the laser beam for recording. As each successive area of the path is heated locally to the vicinity of its Curie point in the presence of a controlled magnetic field, a magneto-optic density is produced proportional to the amplitude of the controlled magnetic field. To play back the recorded signal, the intensity of the laser beam is reduced and a Faraday or Kerr effect analyzer is employed, with a photodetector, as a transducer for producing an output signal. The light intensity of the laser beam is continuously detected close to the analyzer, particularly during playback operation, and compared with a reference to maintain intensity substantially constant.

9 Claims, 3 Drawing Figures

INVENTORS
GEORGE W. LEWICKI
JOHN E. GUISINGER
BY
Lindenberg, Freilich & Wasserman
ATTORNEYS INVENTORS
GEORGE W. LEWICKI
JOHN E. GUISINGER
BY
Lindenberg, Freilich & Wasserman
ATTORNEYS

THERMOMAGNETIC RECORDING AND MAGNETO-OPTIC PLAYBACK SYSTEM HAVING CONSTANT INTENSITY LASER BEAM CONTROL

This is a division of application Ser. No. 34,989, filed May 6, 1970, now abandoned.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to apparatus for maintaining the intensity of a laser beam substantially constant.

It has recently been discovered that analog recording to an isotropic film is possible using Curie point recording and playback techniques, as described in a copending application Ser. No. 805,549, now U.S. Pat. No. 3,626,114, filed Mar. 10, 1969 for a Thermomagnetic Recording and Magneto-Optic Playback System and assigned to the assignee of the present invention.

As described in the aforesaid application, a laser beam is employed to heat successive areas of an isotropic film in the presence of a magnetic field controlled by an analog signal. As the successively heated areas are cooled while still in the presence of the controlled magnetic field, a magneto-optic density proportional to the amplitude of the analog signal is established. The use of a laser beam makes it possible to create discrete magnetic domains in the isotropic film on the order of 1 micron in diameter.

Since the magneto-optic density of a given area of the film is proportional to the direction and magnitude of the magnetic field present while it is cooled, the input signal thus recorded may be readily detected by analysis of the Faraday or Kerr effect produced by that area on a polarized beam of light.

A laser beam is directed through a polarizer, for playback, toward the recorded area on the film in the same direction as the recording magnetic field, i.e., in a direction perpendicular to the surface of the film, but the intensity of the laser beam is reduced sufficiently to avoid heating the isotropic film to the vicinity of its Curie point. Using the same laser and optical arrangement employed for recording makes it possible to examine discrete magnetic domains using the Faraday or Kerr effect on polarized light.

The Faraday and Kerr effects may both be referred to generically as a magneto-optic effect, which is the rotation of the plane of polarization produced by discrete magnetic domains of the film on a beam of polarized light, with the direction and magnitude of the angle of rotation corresponding to the direction and magnitude of magnitization of the film. To detect the magneto-optic effect as a record path on a film is scanned with a beam of polarized light, an analyzer is employed comprising a resolver, such as a Glan-Thompson prism, which resolves the polarized light E that has been rotated through an angle $\theta$ into two components, one with an amplitude E cos $(45° + \theta)$ and the other with an amplitude E $(\sin 45° - \theta)$, where the axis of the polarizer is rotated 45° from the neutral (unrotated) plane of polarization of the beam impinging on the film. Two suitable photosensitive devices then provide electrical signals proportional to the amplitudes of the two components, and a differential amplifier provides the difference as the desired output signal. While this technique of deriving the difference of the two components provides greater sensitivity in detecting the angle of rotation, it has been discovered that variations in the intensity of the laser beam will, except for very small variations of less than 0.1 percent, significantly affect the amplitude of the output signal since a change of intensity cannot be distinguished from a change in angle of rotation.

Experiments with a 60 milliwatt helium-neon gas laser have shown that the intensity of light fluctuates randomly from one to two percent, and it is believed that other gas lasers will fluctuate from one to two percent, or more. This is believed to be primarily due to the fact that the helium and neon atoms are in constant motion in the electrical discharge field, thereby causing fluctuations in the excitation of the helium atoms which must be in agitated motion in order for them to collide with neon atoms. In the collision, energy is transferred from the helium to the neon atoms. Once this occurs, emission of photons take place as excited neon atoms drop to a lower energy level.

In injection lasers using, for example, a forward-biased galium arsenide diode, the atoms are not mobile, but it is believed that there will nevertheless be variations in the intensity of light due to 1/F noise inherent in semiconductors. In addition, the operation of semiconductors is known to fluctuate with temperature and to degrade over long periods of time for analog recording in the frequency range of from 10 Hz to 10,000 Hz. The noise level will increase as the frequency F decreases so that at lower frequencies this noise may impair accuracy of rotation angle measurement and limits resolution. Accordingly, it would be desirable to control the intensity of light from either a gas laser or an injection (diode) laser to less than 0.1 percent.

SUMMARY OF THE INVENTION

In accordance with the present invention, the intensity of the laser beam is maintained substantially constant by sampling the laser beam as close to the system using the beam as conveniently possible and detecting the intensity of unresolved light to produce a feedback signal for comparison with a reference signal. The comparison produces an error signal which is integrated over a period of about 1 millisecond to provide a control signal. The control signal is then applied to an electro-optic device, such as a Pockels cell or a Kerr cell, in the light path between the laser and the system using the beam. In the case of an injection laser, the control signal is employed to vary the forward bias voltage of the laser diode.

The novel features that are considered characteristic of this invention are set forth with particularity in the appended claims. The invention will best be understood from the following description when read in conjunction with the accompanying drawings.

DESCRIPTION OF THE PREFERRED EMBODIMENTS

Figure 1:
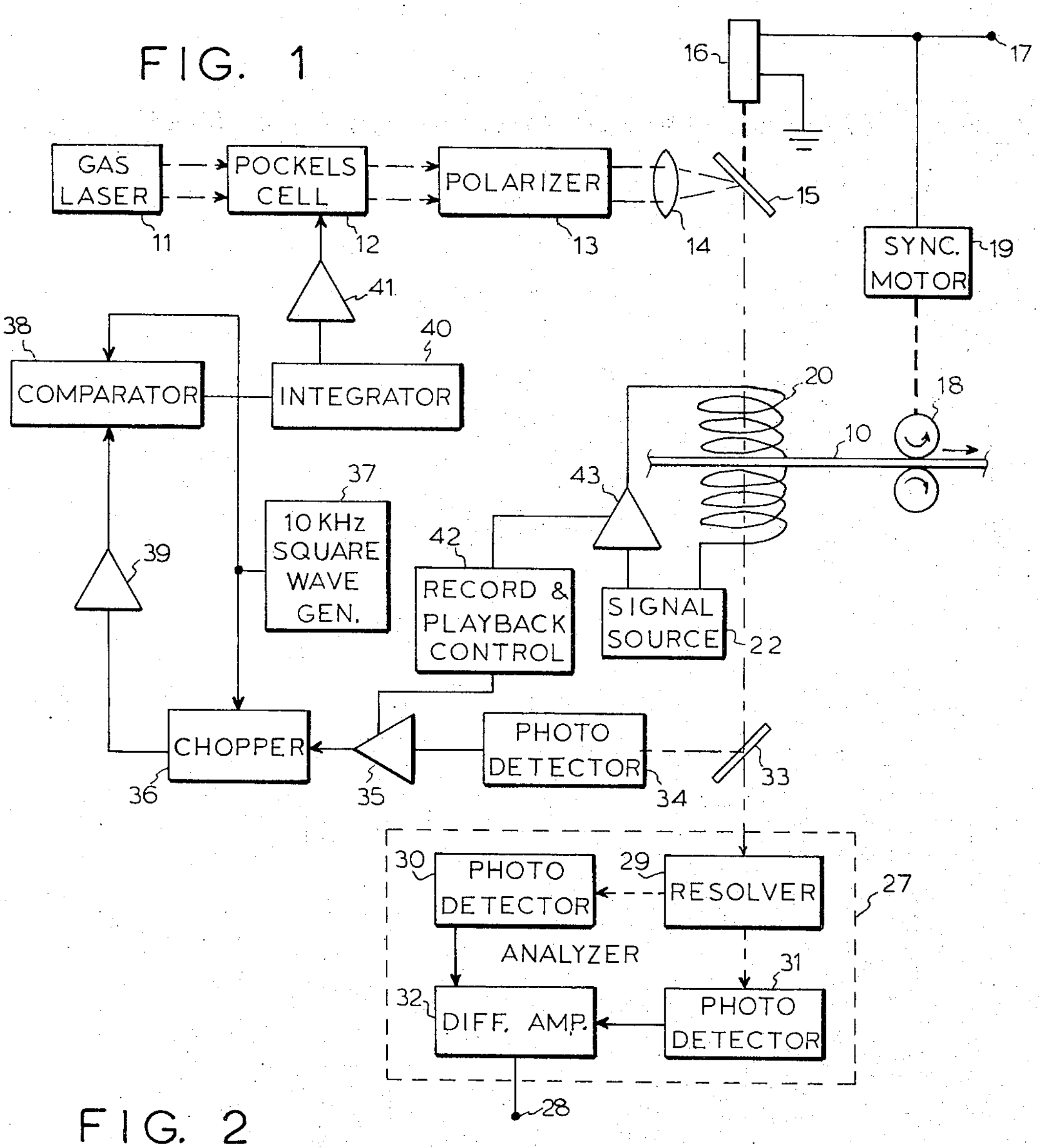
FIG. 1 shows a schematic block diagram for a thermomagnetic recording and magneto-optic playback system using the Faraday effect with intensity control of a laser beam according to the present invention.

In a preferred embodiment of the invention as shown in FIG. 1, a thin film 10 of suitable isotropic material, such as a thin film of manganese bismuthide (MnBi) is heated to its Curie point by a beam of light from a gas laser 11 transmitted through an energized electro-optical attenuator, such as a Pockels cell 12. A polarizer 13 is provided to polarize the coherent monochromatic light transmitted by the laser 11 through the Pockels cell 12.

The laser beam is focused by a lens 14 to a beam deflecting means, such as a mirror 15, to direct a vary narrow beam of light onto the film 10 for the purpose of heating it to its Curie while recording. The mirror 15 is vibrated by a solenoid 16 in response to a low frequency signal applied at a terminal 17. The arrangement of the mirror 15 is for vibration about a longitudinal axis lying in the plane of the paper so that the beam is deflected back and forth across the width of the film 10 while it is being moved along its length by a mechanism 18 driven by a synchronous motor 19 connected to the terminal 17. For applications requiring higher scanning rates, the scanning mechanism may consist of a quartz crystal for vibrating a reflecting surface.

While recording, a Helmholtz coil 20, or its electromagnetic equivalent, is energized by an input signal from a source 22, such as a source of video information. In that manner, a magnetic field perpendicular to the film 10 is varied in response to a signal from the source 22 so that, as discrete areas of the film area are heated by the laser beam, the magneto-optic density of successive areas will vary as a function of the input signal due to the varying magnetic field applied while the successively heated areas of the continuous record path cool in the presence of the magnetic field.

To play back (read out) a recorded signal, the Pockels cell 12 is de-energized and the signal from the source 22 is cut off as will be described more fully hereinafter. De-energizing the Pockels cell 12 alters the refractive properties of a piezoelectric crystalline medium in the cell to cause less light to be transmitted through the polarizer 13. The beam of polarized monochromatic light from the gas laser 11 focused by the lens 14, and directed onto the film 10 by the mirror 15, is not of sufficient intensity to heat the film to its Curie point, but is of sufficient intensity for light transmitted through the film to be analyzed with respect to the Faraday effect produced by the magneto-optic density record on the film.

An analyzer 27 responds to the average rotation of the light transmitted through the film 10 to produce at an output terminal 28 an analog signal directly proportional to the input signal recorded. This may be accomplished by a resolver 29 comprising a Glan-Thompson prism which resolves the polarized light E rotated through an angle $\theta$ into two components, one with an amplitude E cos $(45° + \theta)$ and the other an amplitude E sin $(45° - \theta)$. Detectors 30 and 31, comprising suitable photosensitive devices, provide electrical signals proportional to the amplitudes of the two components, and a differential amplifier 32 provides the desired signal at the output terminal 28 as the difference between the two component signals.

The thermo-magnetic recording and magneto-optic playback system thus far described is essentially as disclosed in the aforesaid copending application. If the intensity E of the laser beam varies significantly, i.e., varies by more than 0.1 percent, the change of intensity E cannot be distinguished from a change in the angle of rotation because the output signal at terminal 28 is proportional to $E^2[\cos(45° + \theta) - \sin(45° - \theta)]$ so that any variation $\Delta E$ will produce a change in the output signal proportional to $\Delta E^2$.

To control the intensity of the laser beam passing through the film 10 and into the resolver 28 substantially constant, a beam splitter 33, such as a half-silvered mirror, is placed in the path of that laser beam to reflect a portion of it into a photo-detector 34. The output of the photodetector, which varies as the intensity of the laser beam varies, is amplified by a control amplifier 35 and applied as a feedback signal to a chopper 36, such as a Double Balanced Mixer, Model 10514A, commercially available from Hewlett-Packard which is a versatile device of broadband (200 KHZ to 500 MHZ) application that can serve as a modulator.

A 10 KHZ square wave generator 37 is applied to the chopper 36 to modulate the amplified signal from the photodetector 34. The result is a square wave of an amplitude which varies as the intensity of the laser beam varies. That square wave is applied to a comparator 38 through an amplifier 39 for comparison with the square wave from the generator 37. The square wave from the generator 37 thus serves as the reference signal for the comparator 38. To adjust the intensity of the laser beam, the amplitude of the square wave from the generator 37 may be adjusted but it is preferred to simply adjust the gain of the amplifier 39. The output of the comparator 38 is then applied to an integrator 40 having a time constant for integration of 1 millisecond which is the period of 1 kc noise.

The period of integration is selected to be the period of the low frequency noise from zero to 1 kc, the range of noise where intensity variations exceed more than about 1 percent. The frequency selected for the square wave generator 37 is then selected for a period of 1/10th the integration period so that 10 samples of the signal from the photodetector 34 are taken for a given integration period. However, some other suitable number of samples may be selected, such as from 5 to 10 or from 10 to 20 or more.

The output of the integrator 40 is applied as a control signal to the Pockels cell through an amplifier 41 to control the intensity of the laser beam transmitted through the polarizer 13. As the intensity of the light detected by the photodetector 34 decreases, the amplitude of the square wave feedback signal applied to the comparator 38 through the amplifier 39 decreases, thereby causing the amplitude of the control signal from the integrator 40 to increase to a higher positive voltage level. By increasing the energizing voltage to the Pockels cell, more light is transmitted through the polarizer 13. Conversely, as the intensity of the laser beam increases, the amplitude of the square wave transmitted through the amplifier 39 increases to decrease the voltage applied to the Pockels cell through the amplifier 41.

It should be noted that the Pockels cell 12 and polarizer 13 may be arranged to transmit less light for a greater voltage applied to the Pockels cell, in which case the amplifier 41 should be provided as an inverting amplifier. This is because the Pockels cell received plane polarized light from the gas laser 11 and transmits eliptically polarized light with the major axis rotated clockwise or counterclockwise depending upon the polarity of the voltage applied to it.

If the arrangement is for rotating the axis of the eliptically polarized light clockwise, for a given bias voltage provided by the amplifier 41 with a zero error signal from the comparator 38, the polarizer 13 may then be rotated from an initial portion with its axis of polarization parallel to the major axis of the eliptically polarized light from the Pockels cell and then further rotated clockwise to decrease the intensity of the light transmitted through it for the given bias voltage. If that voltage is positive, a decrease in light intensity detected by the photodetector 34 will then cause an increase in positive voltage from the integrator 40. If that error signal is then integrated and amplified without inversion, the major axis of the eliptically polarized light transmitted through the Pockels cell will rotate further clockwise to increase the intensity of the light transmitted through the polarizer. If, on the other hand, the polarizer is initially rotated counterclockwise, to increase the intensity of the light, it then becomes necessary to apply a less positive voltage to the Pockels cell. To accomplish that, the amplifier 41 is provided as an inverting amplifier. Thus, without prior knowledge of how the Pockels cell will respond to a change in bias voltage, if the polarizer 13 is initially rotated in the wrong direction, proper phase of the feedback control can be achieved by simply rotating the polarizer in the opposite direction. Once the initial position of the polarizer is established, the desired level of beam intensity can be readily established by adjusting the gain of the amplifier 39, such as through a potentiometer at the input thereof.

Although intensity control of the laser beam to less than 0.1 percent is not necessary for thermomagnetic recording on the isotropic film, the feedback control system employed during playback may be used while recording. Since a higher intensity is required for recording, the signal from the photodetector 34 may be decreased during playback through a variable gain control element while recording, thereby causing the comparator 38 to produce a large error signal to significantly increase the intensity of the laser beam being directed onto the isotropic film.

A record and playback control unit 42 will, during playback operation, bias an amplifier 43 to cut-off and bias the amplifier 35 for operation at a predetermined gain level. For recording, the amplifier 35 is simply biased by the unit 42 for operation at a lower gain level, thereby causing the feedback control to increase the intensity of the laser beam while the amplifier 43 is biased at a predetermined gain level for recording. Thus the amplifier 35 in the feedback control circuit is employed as a variable gain control element to switch the intensity of the laser beam from a low level to a high level for recording.

To conserve power while not recording, the power supply to the amplifier 43 and the signal source 22 may be turned off through a manually controlled switch, but in applications where the system is being periodically switched back and forth between record and playback modes, the control unit 42 is preferably employed to control the gain of the amplifier 43 as shown.

The record and playback control unit may, in its simplest form, be a flip-flop which is set to record, thereby increasing the gain of the amplifier 43 and decreasing the gain of the amplifier 35. When it is reset, the gain of the amplifier 35 is then increased while the gain of the amplifier 43 is decreased to zero. The true and false output terminals of the flip-flop may be coupled to the gain control terminals of the amplifiers 35 and 43 through suitable voltage level shifting circuits, such as suitably biased amplifiers.

Figure 2:
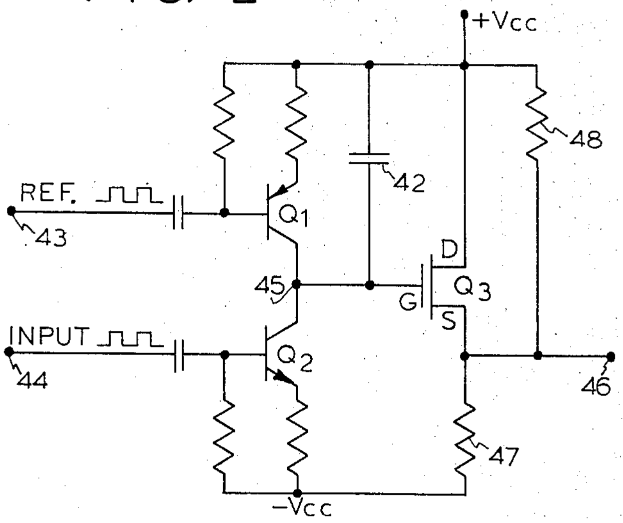
FIG. 2 shows a circuit diagram of a comparator and integrator for use in the system of FIG. 1.

The comparator 38 and the integrator 40 will now be described with reference to FIG. 2 wherein junction transistor $Q_1$ and $Q_2$ of the PNP and NPN type, respectively, comprise the comparator 38. A capacitor 42 and a field-effect transistor $Q_3$ then comprise the integrator 40. The base of the transistor $Q_1$ is RC coupled to an input terminal 43 connected to the square wave generator 37, while the base of the transistor $Q_2$ is RC coupled to an input terminal 44 connected to the amplifier 39. The gate of the transistor $Q_3$ is connected to a junction 45 between the transistors $Q_1$ and $Q_2$, and the source of the transistor $Q_3$ is connected to an output terminal 46. Voltage dividing resistors 47 and 48 are selected to provide the desired bias voltage through the amplifier 41 (FIG. 1) when the input square wave amplitude is equal to the reference square wave amplitude.

The transistors $Q_1$ and $Q_2$ are chosen to have identical and complementary PNP and NPN characteristics, with a maximum leakage current not exceeding 1 na, with a $\beta$ of 200. The transistor $Q_3$ is chosen to be an N-channel, depletion-mode field-effect transistor of the insulated-gate type. Suitable transistors commercially available for the transistors $Q_1$, $Q_2$ and $Q_3$ are of the type 2N3906, 2N3904 and 2N3631, respectively. Having chosen identical and complementary PNP and NPN transistors, the RC coupling and emitter bias resistors associated with the respective transistors $Q_1$ $Q_2$ are matched so that both transistors conduct equally in response to positive and negative half-cycles, respectively, of square wave input signals when they are of equal amplitude. The transistors thus form a complementary pair in which each transistor and its associated emitter bias resistor constitutes the collector load for the other transistor.

It should be noted that the negative going portion of the input signal to the transistor $Q_1$ is constant and selected to be sufficient to switch the transistor $Q_1$ from off to a predetermined conduction level. Thus the average collector current of the transistor $Q_1$ will be held constant and the transistor $Q_1$ will operate as a constant current source. The positive going portion of the input signal to the transistor $Q_2$ is selected to be of sufficient level to switch the transistor $Q_2$ on, but only to a level proportional to the amplitude of the input signal. Accordingly, the transistor $Q_2$ operates as a variable current generator. When both transistors $Q_1$ and $Q_2$ generate currents of equal amplitude, the capacitor 42 neither charges nor discharges and the voltage at the point 45 is at a value between $+V_c$ and $-V_c$ such as to make the input signals equal, i.e., to place the intensity of the laser beam at the desired norm. If the input signal to the transistor $Q_2$ changes by a small amount, then the potential at the point 45 will change accordingly, to make that portion of each cycle of the signal applied to the transistor $Q_2$ which turns the transistor $Q_2$ on equal to the area of each cycle of the reference square wave signal applied to the transistor $Q_1$ which turns that transistor on.

In view of the foregoing, it may appreciated that the comparison is not strictly one of signal amplitude, but of area of the positive portion of the square wave signal applied to the transistor $Q_2$ with the negative portion of the reference square wave signal applied to the transistor $Q_1$. However, since the area is most influenced by amplitude, in general terms it can be said that the comparator is comparing signal amplitudes. This distinction is pointed out since those skilled in the art will recognize that the square wave signal from the chopper 36 (FIG. 1) may not be of the precise square wave form produced by the square wave generator 37. This distinction is also made for the more important reason that, since a relatively long term integrator is employed, the square wave signal produced by the chopper 36 and transmitted to the comparator 38 by the amplifier 39 may be slightly delayed with respect to the reference square wave applied directly from the square wave generator 37 to the comparator 38 without significantly affecting the desired output. This is for the reason that the transistors $Q_1$ and $Q_2$ connected to the junction 45 are effectively operating as independent current generators and the integrator comprising the capacitor 42 will integrate the current produced by either transistor whenever it is turned on without regard to whether the other transistor is conducting. Therefore, it should be realized that synchronization need not be maintained between the effective portions of the square waves being compared.

The selection of a field-effect transistor for the transistor $Q_3$ is to provide an output amplifier from the integrator 40 having high input impedance in excess of $10^{15}$ ohms. Therefore, there is substantially no loading effect on the integrating capacitor 42. However, the output of the transistor $Q_3$ is on the order of 2 to 5k ohms to facilitate impedance matching, with the input of the amplifier 41 for a maximum power transfer.

Figure 3:
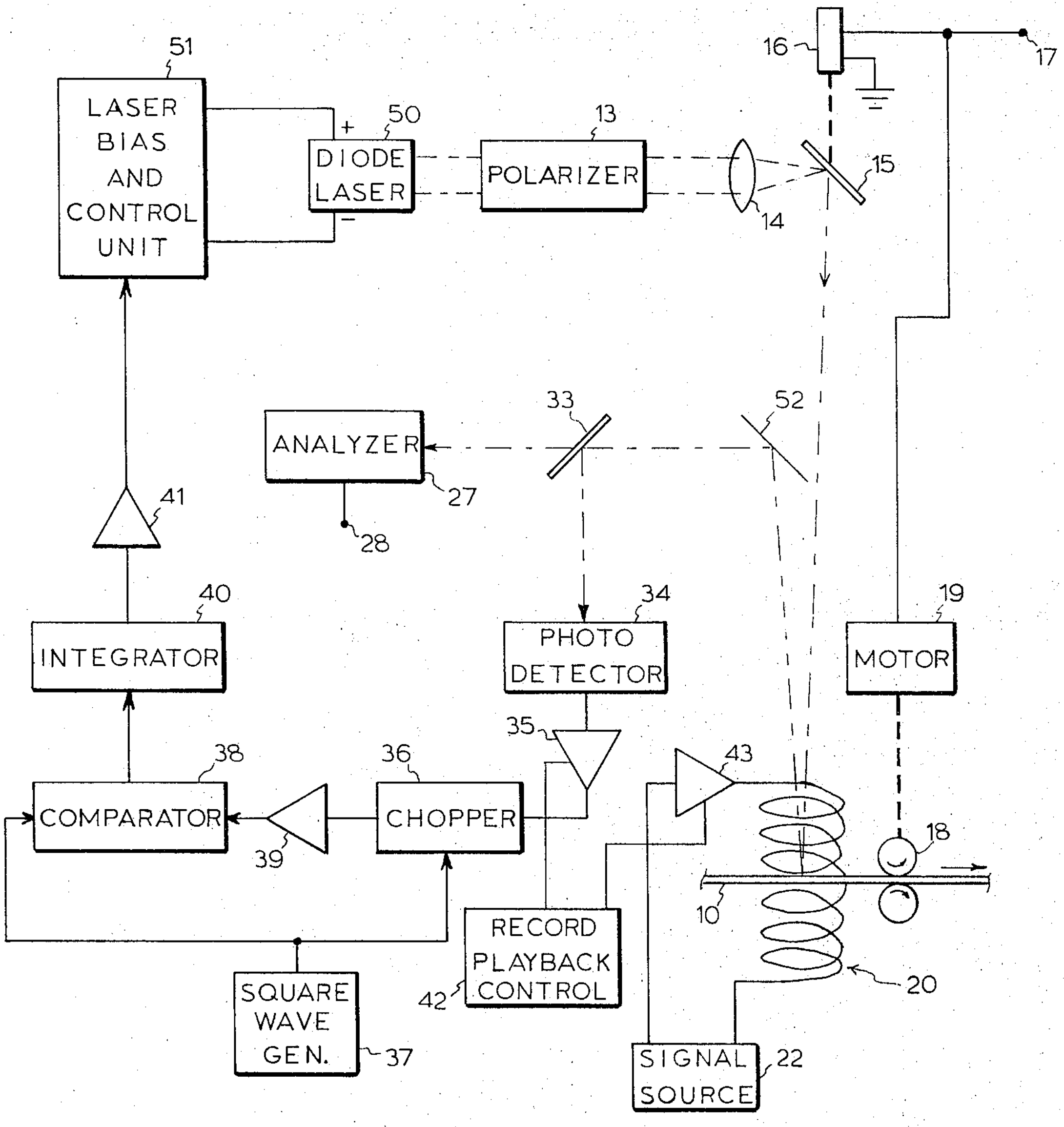
FIG. 3 shows a schematic block diagram for a thermomagnetic recording and magneto-optic playback system using the Kerr effect with intensity control of a laser beam according to the present invention.

Referring now to FIG. 3, which shows a second embodiment of the invention with like components identified by the same reference numerals, a laser diode 50 is employed as the coherent light source. The most common semiconductor diode used as a diode laser, commonly referred to as an injection laser, is a Gallium Arsenide diode prepared by adding impurities in the form of tellurium and zinc to produce two kinds of conductivity. The tellurium, which replaces some of the arsenic atoms, has more electrons than arsenic, making it an N-type material, i.e., a donner with an excess of electrons. When zinc is added to the Gallium Arsenide, it replaces some of the Gallium atoms and gives the material a deficiency of electrons making it a P-type material. The extra electrons in the N-type region are held in a bond called the conduction bond, while the deficiency of electrons on the P side of the junction occur in a region called the valence bond. Application of current causes electrons to move from the conduction bond into holes in the valence bond. This process is called recombination and results in the emission of photons. If the forward bias that is applied to the semiconductor is great enough, a large number of electrons and holes will concentrate in a very narrow (1/10,000 inch) region called the active region on the P side of the junction. The number of electrons and holes will increase as the forward bias voltage is increased within reasonable limits. The electrons passing into the active region possess energy, some of which is given up as photons when they combine with holes. These photons in turn stimulate the emission of more photons by accelerating the recombination of injected electrons with holes. Each time a photon stimulates the emission of a second photon, the emission occurs in phase with the first, and in the same direction to produce coherent light.

Recently developed and commercially available continuous-wave injection lasers will provide more than one watt of coherent light for 5 watts of input power, making use of injection lasers feasible for use in thermomagnetic recording and magneto-optic playback systems which require only about 60 millowatts of power for recording and, of course, less for playback.

While injection lasers have generally been operated at liquid helium, hydrogen and nitrogen temperatures, ranging from 270° to 190° below zero centigrade to prevent excessive heating while operating continuously, more recent developments make operating injection diodes at normal ambient temperatures feasible, particularly, at the low levels of power required for systems of the present invention.

A laser bias and control unit 51 provides the necessary forward bias for the diode laser with provision for sufficient variation in the forward bias to achieve the desired control in response to the error signal from the amplifier 41. For good control, the laser bias source is preferably a well regulated DC voltage source, with a voltage variable attenuator in series, or a variable reference voltage in the DC voltage regulator itself, such that the reference voltage may be increased or decreased slightly in response to the output signal from the amplifier 41.

Another important variation of the present invention illustrated in FIG. 4 is a playback system which employs the Kerr effect. That is achieved by directing the laser beam onto the film 10 slightly off axis by about 1° in order to be able to place a mirror 52 in the path of reflected light from the film 10. That mirror serves only to direct reflected light to the beam splitter 33. That portion of reflected light not passed through the beam splitter is directed into the photodetector 34 for laser beam control as in the embodiment of FIG. 1. The light transmitted by the beam splitter 33 to the analyzer 27 will produce a signal at the output terminal 28 in the same manner as described hereinbefore with reference to FIG. 1 since the Kerr effect of a magnified area on the film 10 on reflected polarized light is rotation the same as is produced by the Faraday effect on light transmitted through the film.

It should be noted that in both embodiments the beam splitter 33 has been placed as close to the analyzer 27 as conveniently possible, in order that any variation in the intensity of light received by the analyzer 27 due to ambient conditions be substantially the same for light received by the photodetector 34. In other words, the physical conditions surrounding the analyzer 27 and the photodetector should be as nearly the same as possible with the separate beam paths from the beam splitter 33 as short as possible.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. In a magneto-optic playback system for producing an electrical signal proportional to the direction and amplitude of magnetization of discrete areas of a film, said system having means for directing a continuous laser beam through a polarizer to said film as said film is moved passed a playback station, whereby said discrete areas rotate said polarized light impinging thereon in proportion to the magnetic fields of said areas, said system further having analyzing means disposed to receive said laser beam after it has been rotated by said discrete areas for producing said electrical signal, apparatus for maintaining the intensity of said laser beam substantially constant comprising:

means for producing a continuous laser beam, said laser beam producing means including beam intensity control means responsive to a control signal;

means for continuously sampling said laser beam at a point in the beam path close to said analyzing means and for producing in response thereto a feedback signal proportional to the intensity of the beam sample;

a source of a substantially constant reference signal;

means for comparing said reference signal with said feedback signal to produce an error signal proportional to the difference in amplitude between said feed-back signal and said reference signal;

means for integrating said error signal to produce said control signal; and means for applying said control signal to said beam intensity control means, thereby maintaining the intensity of said laser beam substantially constant.

2. Apparatus as defined in claim 1 wherein said means for producing a continuous laser beam comprises a gas laser, and said beam intensity control means comprises a device which exhibits an electro-optic effect in response to said control voltage signal to vary the intensity of said laser beam to said utilization means.

3. Apparatus as defined in claim 1 wherein said means for producing a continuous laser beam comprises an injection laser having a suitably prepared and forward biased semiconductor diode, and said beam intensity control means comprises means for controlling the level of forward bias of said diode.

4. In a magneto-optic playback system for producing an electrical output signal proportional to the direction and amplitude at all levels between two extremes of magnetization of discrete areas of a film as successive areas of said film are moved through a playback station, the combination comprising:

a gas laser for producing a beam of light;

an electro-optic device for controlling the intensity of light transmitted therethrough in response to a control signal;

a light polarizer;

means for directing said light beam through said electro-optic device and said light polarizer to said film at said playback station;

analyzing means including a resolver for receiving said beam of light, after it has impinged upon said film and has been rotated by the magnetic fields of successive areas, and producing said output signal;

means responsive to the intensity of unresolved light for producing a feedback signal;

means interposed in the light path between said film and said analyzing means for directing part of said light beam toward said analyzing means and directing the balance of said light beam toward said feedback signal means;

a source of a substantially constant reference signal;

means for comparing said reference signal with said feedback signal to produce an error signal proportional to the difference in amplitude between said feedback signal and said reference signal;

means for integrating said error signal to produce a control signal; and means for applying said control signal to said electro-optic device to maintain the intensity of light transmitted therethrough substantially constant.

5. Apparatus as defined in claim 4 including apparatus for employing said magneto-optic playback system for thermomagnetic recording of an input signal in response to a record mode select signal comprising:

means at said playback station responsive to said record mode select signal for producing a magnetic field proportional to said input signal to be recorded; and variable gain control means responsive to said record mode select signal to decrease said feedback signal, thereby increasing the intensity of said beam of light for thermomagnetic recording.

6. Apparatus as defined in claim 4 wherein said reference signal is a square wave and said comparing means comprises:

means responsive to said reference signal for modulating said feedback signal to produce a modulated feedback signal;

a first amplifying means coupling half cycles of said reference signal of a given polarity to said integrating means; and a second amplifying means coupling half cycles of said modulated feedback signal of a polarity opposite said given polarity to said integrating means, whereby said modulated feedback signal applied to said second amplifying means need not by synchronized with said reference signal applied to said first amplifying means.

7. In a magneto-optic system for producing an electrical output signal proportional to the direction and amplitude at all levels between two extremes of magnetization of discrete areas of a film as successive areas of said film are moved through a playback station, the combination comprising:

an injection laser for producing a beam of light, said injection laser having a suitably prepared semiconductor diode forward biased by a signal controlled bias means;

a light polarizer;

means for directing said light beam through said polarizer to said film at said playback station;

analyzing means including a resolver for receiving said beam of light, after it has impinged said film and has been rotated by the magnetic fields of successive areas, and producing said output signal;

means responsive to the intensity of unresolved light for producing a feedback signal;

means interposed in the light path between said film and said analyzing means for directing part of said light beam toward said analyzing means and directing the balance of said light beam toward said feedback signal means;

a source of a substantially constant reference signal;

means for comparing said reference signal with said feedback signal to produce an error signal proportional to the difference in amplitude between said feedback signal and said reference signal;

means for integrating said error signal to produce a control signal; and means for applying said control signal to said signal controlled bias means to maintain the intensity of said light beam substantially constant.

8. Apparatus as defined in claim 7 including apparatus for employing said magneto-optic playback system for thermomagnetic recording of an input signal in response to a record mode select signal comprising:

means at said playback station responsive to said record mode select signal for producing a magnetic field proportional to said input signal to be recorded; and variable gain control means responsive to said record mode select signal to decrease said feedback signal, thereby increasing the intensity of said beam of light for thermomagnetic recording.

9. Apparatus as defined in claim 7 wherein said reference signal is a square wave and said comparing means comprises:

means responsive to said reference signal for modulating said feedback signal to produce a modulated feedback signal;

a first amplifying means coupling half cycles of said reference signal of a given polarity to said integrating means; and a second amplifying means coupling half cycles of said modulated feedback signal of a polarity opposite said given polarity to said integrating means, whereby said modulated feedback signal applied to said second amplifying means need not be synchronized with said reference signal applied to said first amplifying means.

* * * * *